Patented May 31, 1927.

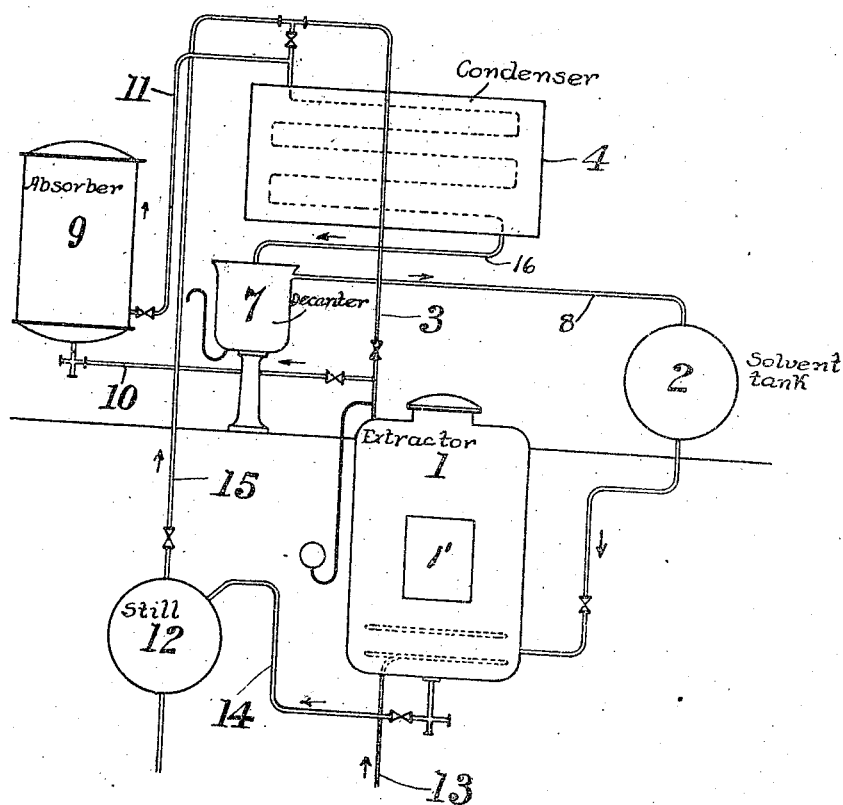

1,631,036

UNITED STATES PATENT OFFICE.

EDWARD ALLAN IRONSIDE, OF LONDON, ENGLAND.

APPARATUS FOR THE EXTRACTION AND RECOVERY OF VOLATILE LIQUIDS.

Application filed November 6, 1925, Serial No. 67,390, and in Great Britain November 8, 1924.

This invention relates to a plant or installation for, extracting or recovering solvents from gases, materials or substances of various kinds, an object of the invention being to extract or recover more solvent than is usually obtained by ordinary extractors and for effecting the recovery or extraction in a better manner.

The plant comprises any suitable form of extracting apparatus, and the invention may be broadly described as a combined extractor dsorber consisting in combining extractor apparatus for the extraction of added or other solvents and also for the extraction of solvents created or produced by combustion or otherwise with an adsorber containing any solid adsorbing material, e. g. activated charcoal or silica gel. which in a general way comes into use after the bulk of the solvent has been taken out from the extractor plant, said adsorber may effect the final extraction or recovery by passing air or other gas or mixture of gases through or between the material or substance and through the adsorber after the main part or bulk of the solvent has been removed. The air or other gas or mixture of gasses may be heated if desired and may be under any suitable pressure.

The invention can be applied to many purposes, including the treatment of town gas or coke oven gas. As an example of the invention applied to the extraction of grease from hides, I construct a conventional extractor plant comprising a cylindrical or other extractor in which the hides are placed, say by hanging them on supports, and a solvent such as petrol is introduced from a storage tank and steam from a boiler is discharged into the chamber in much the usual manner. This effects a large extraction of the grease and the extract is conducted to a still and the solvent vapour taken to a condenser from which it passes to a decanter where the water and the solvent are separated, the water being led to waste and the solvent conducted back to the storage tank.

With this plant I use an adsorber which may be connected by tubes or equivalents to any suitable parts of the plant. These tubes may be permanently open to these parts, or valves may be fitted by which the adsorber can be isolated whilst the main part of the extractor plant is in use, or the adsorber may be in action simultaneously with the extractor and other part of the extractor plant.

The use of the adsorber enables me to obtain, either by way of recovery or extraction, or both, a greater percentage of solvent than has hitherto been possible.

For example, in addition to the solvent recovered from the extractor by means of steam some solvent still remains in the hides above mentioned, and this may be driven direct into the condenser by a suitable pipe, but in a general way there is still an appreciable and valuable quantity of solvent left in the hides and to recover this I open communication between the extractor and an adsorber of any suitable kind, and which is also connected to the condenser, and I force air or other gas or mixture of gases into the extractor and through or amongst the hides from whence it passes through the adsorber and into the condenser.

A suitable adsorber is that described in the specification of my British Letters Patent No. 238,984 and by which I obtain the following advantages:

(1) The vapour gas is distributed as evenly as possible over the exposed area of the adsorbent material.

(2) The superheated steam removing the adsorbed solvent is also distributed as evenly as possible.

(3) Each particle of carbon is not more than a specified distance from the heating and cooling coils.

(4) That while allowing the gases to escape freely, means is taken to prevent any of the disintegrated adsorbent material from passing to the condenser.

A steam pipe or pipes can be connected to a coil (not shown) in the adsorber to vaporize or free the adsorbed solvent which is led away to a condenser connected to a decanter and/or the storage tank.

The pipes connecting the adsorber to the extractor and the condenser will be fitted with valves to shut it off and open it up as required.

I will now describe my invention with reference to the accompanying diagrammatic drawing in which the extractor 1 is connected to a solvent storage tank 2 and by a pipe 3 to a condenser 4. The condenser has a pipe 16 to the decanter 7 which is connected by pipe 8 to the solvent tank 2.

An adsorber 9 is connected, by pipe 10, to the extractor and by pipe 11 to the condenser A still 12 is connected in usual manner by pipe 14 to the extractor and by pipe 15 to the condenser.

A steam supply is connected by pipe 13 to a coil 17 in the extractor and the operation of the apparatus is substantially as hereinafter described.

Assuming hides are to be treated they are placed in the upper part of the extractor 1 through an opening closed by a door 1' and petrol or other suitable solvent is introduced from the solvent tank 2 through a pipe, steam is also introduced to the extractor through the pipe 13 and the process of grease extraction is then carried on. When this operation is completed the extract is run off into still 12 through discharge pipe 14. In the still the extract is heated and the solvent taken off by pipe 15 to condenser 4, from the condenser it passes to decanter 7 where the condensed water and solvent are separated, the solvent is returned again to the tank 2 by pipe 8 and the water passes to the drain.

In addition to the solvent recovered as described above, a quantity of solvent which remains in the hides when the extract is run off to the still is passed direct as vapour by means of steam or other suitable means to the condenser 4 through the pipe 3, but there is still a fair percentage of solvent left in the hides which is recovered by the adsorber 9 between the extractor 1 and the condenser 4. To effect this recovery steam under pressure is passed through the extractor to the adsorber where it is steamed out and taken to the condenser.

By the combined use of the adsorber and the extractor plant I am able to recover practically all the solvent in an inexpensive manner and the hides or other materials under treatment are in better condition for sale or use.

The pipes are fitted with valves, indicated in the usual way on the drawing, so that the required connections can be readily made and any parts of the apparatus can be shut off when necessary.

What I claim is:—

A plant or installation for the recovery of solvents from gases or other materials employing an extractor connected by tubes to an adsorber forming part of the plant whereby a solvent introduced into the extractor can be exhaustively recovered from such extractor by passing steam or air under pressure through the extractor to the adsorber.

In testimony whereof I affix my signature.

EDWARD ALLAN IRONSIDE.